United States Patent
Hashimoto et al.

(10) Patent No.: US 10,077,503 B2
(45) Date of Patent: Sep. 18, 2018

(54) PLATED RESIN PRODUCT AND METHOD FOR MANUFACTURING PLATED RESIN PRODUCT

(71) Applicant: TOYODA GOSEI CO., LTD., Kiyosu-shi, Aichi-ken (JP)

(72) Inventors: Moriyuki Hashimoto, Kiyosu (JP); Yosuke Maruoka, Kiyosu (JP); Tatsuya Oba, Kiyosu (JP); Kimihiro Iimura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 66 days.

(21) Appl. No.: 15/334,491

(22) Filed: Oct. 26, 2016

(65) Prior Publication Data

US 2017/0137954 A1  May 18, 2017

(30) Foreign Application Priority Data

Nov. 18, 2015 (JP) ................................. 2015-225908

(51) Int. Cl.
| | |
|---|---|
| *C25D 5/56* | (2006.01) |
| *B60K 11/08* | (2006.01) |
| *C25D 3/04* | (2006.01) |
| *C25D 3/12* | (2006.01) |
| *C25D 3/38* | (2006.01) |
| *C25D 5/14* | (2006.01) |

(Continued)

(52) U.S. Cl.
CPC ................ *C25D 5/56* (2013.01); *B60K 11/08* (2013.01); *C25D 3/04* (2013.01); *C25D 3/12* (2013.01); *C25D 3/38* (2013.01); *C25D 5/14* (2013.01); *B60R 13/005* (2013.01); *B60R 19/52* (2013.01); *B60R 2019/525* (2013.01)

(58) Field of Classification Search
CPC ... B60K 11/04; B60K 11/08; B60R 2019/525; C25D 5/56; C25D 3/04; C25D 3/12; C25D 3/38; C25D 5/14
USPC ...................................... 296/193.1
See application file for complete search history.

(56) References Cited

U.S. PATENT DOCUMENTS

| | | | | |
|---|---|---|---|---|
| 6,041,878 A | * | 3/2000 | Daniels ................. | B60K 11/08 180/68.6 |
| 6,702,343 B1 | * | 3/2004 | Stull ....................... | B60R 19/52 180/68.6 |

(Continued)

FOREIGN PATENT DOCUMENTS

JP         2008-169403 A        7/2008

*Primary Examiner* — Joseph D. Pape
(74) *Attorney, Agent, or Firm* — Posz Law Group, PLC

(57) ABSTRACT

A plated resin product includes a resin base including main plated portions and an auxiliary plated portion and metal films respectively arranged on the main plated portions and the auxiliary plated portion. The main plated portions are arranged next to one another. One of the two main plated portions located at two ends in a direction in which the main plated portions are arranged includes an edge at a portion located at a side of the main plated portion that is far from an adjacent one of the main plated portions. The auxiliary plated portion is located farther from the adjacent main plated portion than the main plated portion including the edge and spaced apart from that main plated portion. The metal film on the auxiliary plated portion is located at a section of the auxiliary plated portion that is non-visible when the product is viewed from the front.

5 Claims, 3 Drawing Sheets

(51) Int. Cl.
*B60R 13/00* (2006.01)
*B60R 19/52* (2006.01)

(56) References Cited

U.S. PATENT DOCUMENTS 8,900,689 B2    12/2014  Ohara et al.
2017/0008473 A1*  1/2017  Walters .................. B60R 19/52

* cited by examiner

Front side ←→ Rear side

PLATED RESIN PRODUCT AND METHOD FOR MANUFACTURING PLATED RESIN PRODUCT

BACKGROUND OF THE INVENTION

The present invention relates to a plated resin product in which a metal film is formed on a resin base including an edge and to a method for manufacturing the plated resin product.

When a plated resin product in which a metal film is formed on a resin base is manufactured through electroplating, the metal film is formed on a plated portion of the base by forming an electroless plated thin film on the surface of the base and then performing a number of processes. The plated resin product, which has undergone plating in such a manner, has a metallic luster that is in accordance with the types of plating components.

When electroplating is performed, the base is held by a jig and immersed in an electroplating tank including an anode electrode. An anode voltage is applied to the anode electrode, and a cathode voltage is applied to the base through the jig.

The plated portion may include an acute edge. When a plated portion having such an edge is electroplated, electric charges in the electroplating solution are apt to concentrate at the edge rather than other sections of the plated portion. This increases the amount of plating metal deposited onto the edge. Thus, the metal film at the edge becomes much thicker than other sections of the plated portion. This lowers the aesthetic appeal of the product.

Japanese Laid-Open Patent Publication No. 2008-169403 discloses a plated resin product in which a base is formed integrally with an auxiliary plated portion (sacrificed portion) that extends to the vicinity of an edge and functions as an auxiliary cathode electrode. The auxiliary plated portion is spaced apart from the edge by a predetermined distance so that the auxiliary plated portion does not contact the edge. Thus, when a cathode voltage is applied to the base during electroplating, the auxiliary plated portion is negatively charged, together with other sections of the base, to function as an auxiliary cathode electrode. As a result, positive electric charges of the metal component dissolved in the electroplating solution collect near the auxiliary plated portion so that the concentration of the electric charges at the edge is limited. This limits the concentration of plating metal deposited onto the edge and forms a metal film having a relatively uniform thickness.

SUMMARY OF THE INVENTION

The auxiliary plated portion of the above publication limits increases in the amount of plating metal deposited onto the edge. However, the auxiliary plated portion becomes unnecessary after the formation of the metal film. When the auxiliary plated portion remains as part of the plated resin product, the auxiliary plated portion may be visible from the front side of the plated resin product. This lowers the aesthetic appeal of the product. Accordingly, a step for removing the auxiliary plated portion needs to be performed after the formation of the metal film.

It is an object of the present invention to provide a metal resin product and a method for manufacturing the metal resin product that eliminate the need to remove an auxiliary plated portion since the auxiliary plated portion will not lower the aesthetic appeal of the product.

To achieve the above object and in accordance with one aspect of the present invention, a plated resin product is provided that includes a resin base including a plurality of main plated portions and an auxiliary plated portion and metal films respectively arranged on the plurality of main plated portions and the auxiliary plated portion. The plated resin product includes a front side directed frontward. The metal film on each of the plurality of main plated portions is located on at least at a section that is visible when the plated resin product is viewed from the front. The plurality of main plated portions are arranged next to and spaced apart from one another. At least one of the two main plated portions located at two ends in a direction in which the plurality of main plated portions are arranged includes at least an edge at a portion located at a side of the at least one of the two main plated portions that is far from an adjacent one of the plurality of main plated portions. The auxiliary plated portion is located farther from the adjacent main plated portion than the main plated portion including the edge and spaced apart from the main plated portion including the edge. The metal film on the auxiliary plated portion is located at a section of the auxiliary plated portion that is non-visible when the plated resin product is viewed from the front.

In the above plated resin product, the base may further include a non-plated portion, which is not provided with a metal film. It is preferred that the non-plated portion be located farther from the adjacent main plated portion than the main plated portion including the edge and spaced apart from the main plated portion including the edge. In this case, the auxiliary plated portion may be located at a rear side of the non-plated portion.

The plated resin product may further include an ornamental member located in front of the non-plated portion. It is preferred that the ornamental member be a discrete member separate from the base. In this case, the auxiliary plated portion may be located between the non-plated portion and the ornamental member.

In the plated resin product, the plurality of main plated portions of the base may form at least a main portion of a grid. The non-plated portion of the base may form a frame that surrounds the grid. The grid, the frame, and the metal films may form a grille inner member of a radiator grille. The ornamental member may be frame-shaped and coupled to the frame of the grille inner member from the front to form a grille outer member of the radiator grille. In this case, it is preferred that the auxiliary plated portion be located between the grille outer member and the frame of the grille inner member.

To achieve the above object and in accordance with another aspect of the present invention, a method for manufacturing the above plated resin product is provided. The method includes applying conductivity to each surface of the plurality of main plated portions and the auxiliary plated portion and electroplating the plurality of main plated portions and the auxiliary plated portion. The electroplating step includes applying, when the plurality of main plated portions and the auxiliary plated portion each surface of which has become conductive are immersed in an electroplating tank, an anode voltage to an anode electrode in the electroplating tank and a cathode voltage to the plurality of main plated portions and the auxiliary plated portion so that the auxiliary plated portion functions as an auxiliary cathode electrode.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A radiator grille of an automobile to which a plated resin product according to one embodiment of the present invention is applied will now be described with reference to FIGS. 1 to 3.

Figure 1:
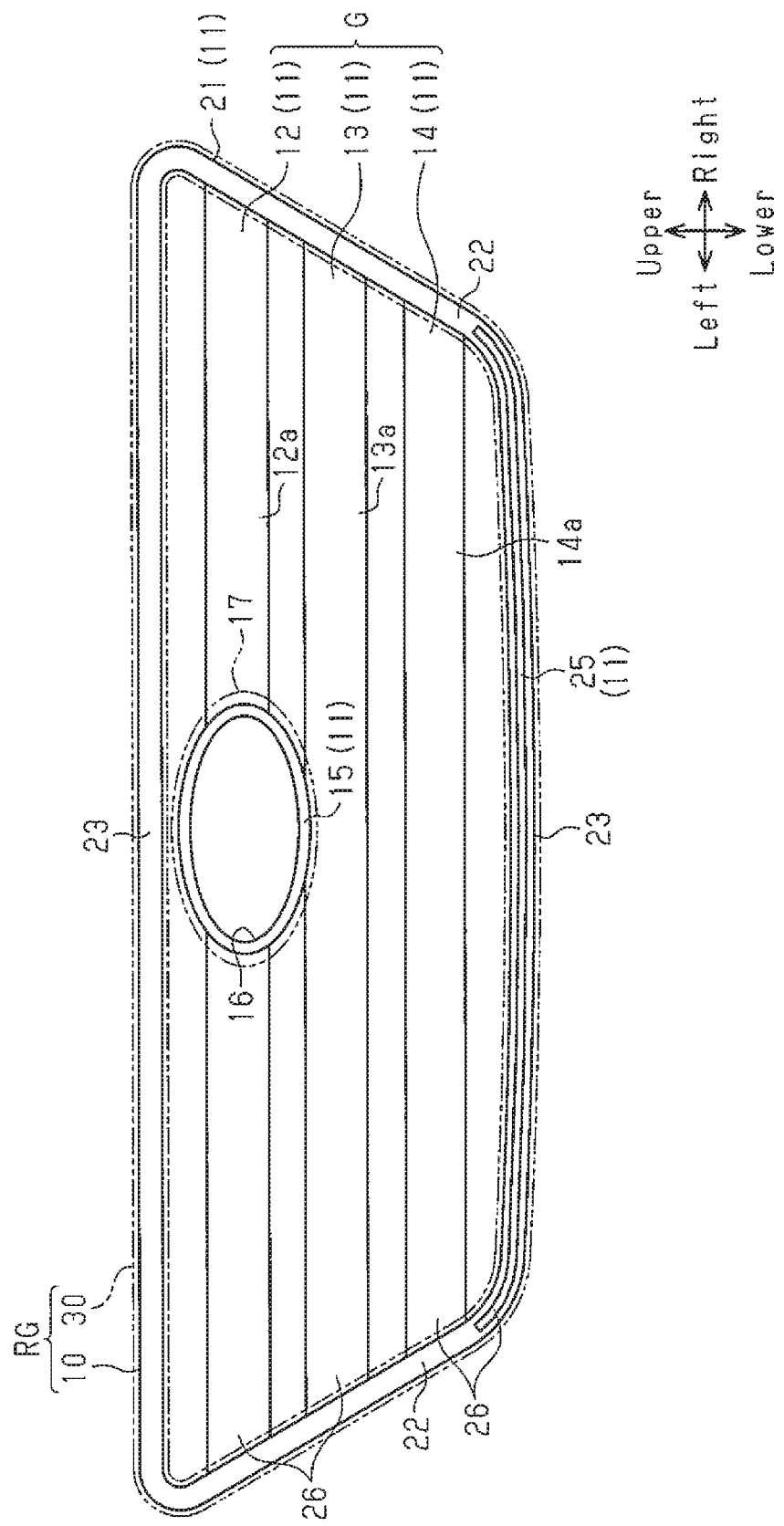
FIG. 1 is a front view showing a radiator grille of an automobile to which a plated resin product according to one embodiment of the present invention is applied.
Figure 2:
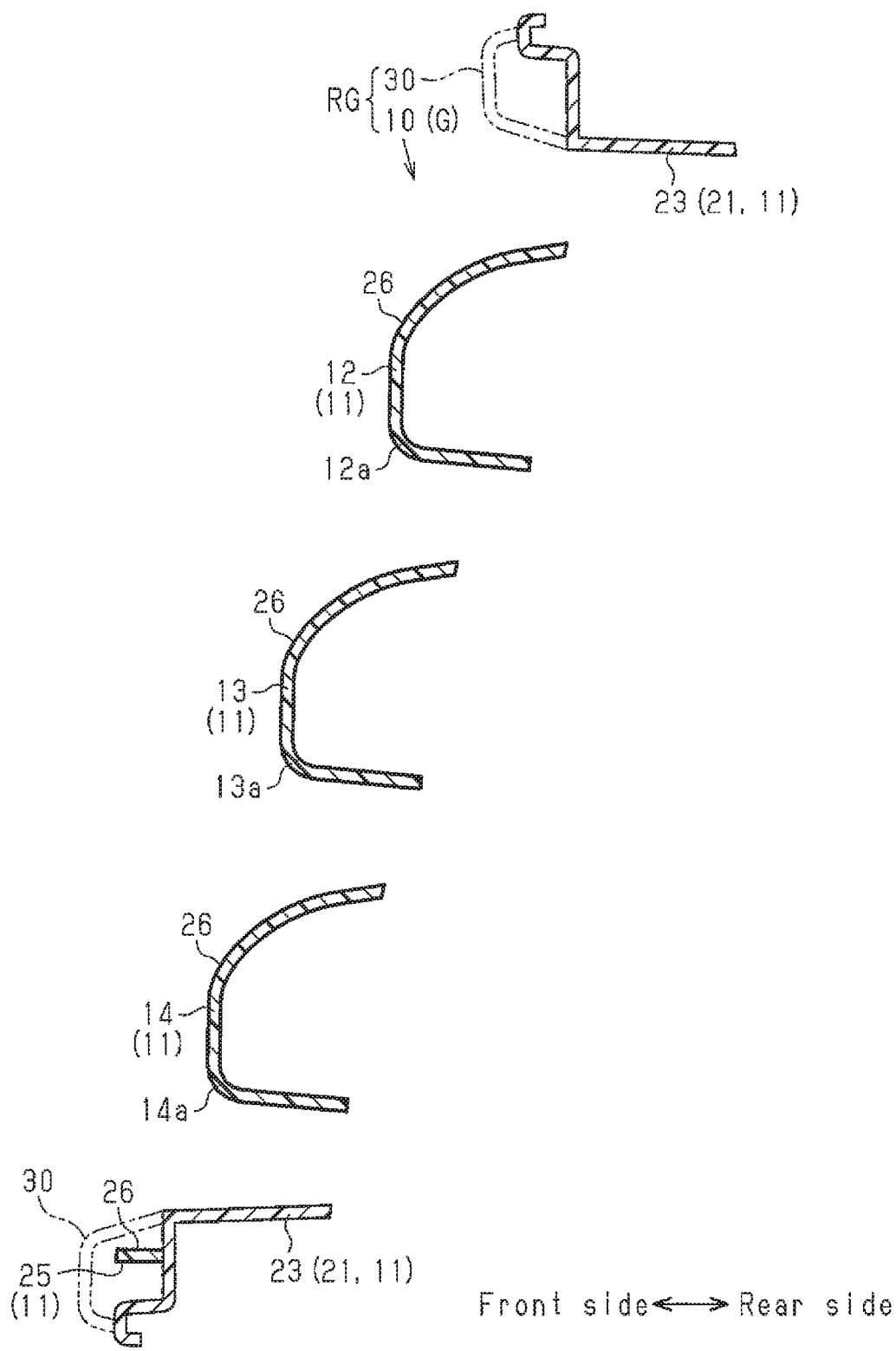
FIG. 2 is a cross-sectional side view showing the radiator grille of the embodiment.

As shown in FIGS. 1 and 2, a radiator grille RG, which is also referred to as a front grille or a front mask, is arranged in front of a radiator (not shown) of an automobile to draw in ambient air and cool the radiator. The radiator grille RG is elongated in the width direction of the automobile or in a horizontal direction. The radiator grille RG includes a grille inner member 10 and a grille outer member 30. The grille inner member 10 is a component that forms the main portion of the radiator grille RG. The grille inner member 10 includes a base 11 and a plurality of metal films 26. The base 11 of the grille inner member 10 is formed from two types of resin materials.

The base 11 includes a grid G and a frame 21 that is formed around the grid G. The grid G includes a plurality of (three in the present embodiment) resin horizontal bars 12, 13, and 14 serving as main plated portions. The frame 21 is formed from a resin that differs from the horizontal bars 12 to 14. The frame 21 forms a non-plated portion.

In the present embodiment, the resin that forms the horizontal bars 12 to 14 is an acrylonitrile butadiene styrene (ABS) copolymer, and the resin that forms the frame 21 is a polycarbonate (PC).

The horizontal bars 12 to 14 are each elongated in the width direction of the automobile. The horizontal bars 12 to 14 are arranged next to one another in the vertical direction. Further, the horizontal grids 12 to 14 are parallel to and separated from one another.

The uppermost horizontal bar 12 includes a lower portion forming an edge 12a that is more angled than other portions of the horizontal bar 12. The horizontal bar 13 includes a lower portion forming an edge 13a that is more angled than other portions of the middle horizontal bar 13. The lowermost horizontal bar 14 includes a lower portion, that is, a portion located far from the upper adjacent horizontal bar 13, forming an edge 14a that is more angled than other portions of the horizontal bar 14. The angle of each of the edges 12a to 14a may be either acute or obtuse. When the horizontal bar 14 is electroplated without taking any measures to obtain a uniform metal film thickness, the formed metal film 26 tends to be thicker at the edge 14a than other portions of the horizontal bar 14.

The metal film 26 is formed through electroplating on each of the horizontal bars 12 to 14 and located on at least at a section that is visible when the radiator grille is viewed from the front. In the present embodiment, the metal film 26 is formed on the entire surface of each of the horizontal bars 12 to 14.

The middle portion of the uppermost horizontal bar 12 in the width direction of the automobile includes a seat 15 to which an ornament 17 such as an automobile emblem is coupled. The seat 15 includes a substantially elliptic coupling hole 16 that is oblong in the horizontal direction. The seat 15 forms part of the base 11.

The frame 21 of the base 11 is formed from a colored resin material and has the shape of a substantially rectangular frame elongated in the horizontal direction. The colored resin material is obtained by mixing a colorant, such as pigment, and, if necessary, a brightening agent to a resin material to color the resin material. Unlike the grid G, the frame 21 is not provided with a metal film 26.

The frame 21 includes two vertical frame pieces 22 that are extended in a substantially vertical direction and separated from each other in the width direction of the automobile and two horizontal frame pieces 23 that are extended in the width direction of the automobile and separated from each other in the vertical direction. The ends of the horizontal bars 12 to 14 are connected to the vertical frame pieces 22.

The front side of the lower horizontal frame piece 23 includes an elongated auxiliary plated portion 25 that extends in the width direction of the automobile generally parallel to the edge 14a of the horizontal bar 14. The auxiliary plated portion 25 is spaced apart from the horizontal bar 14, more specifically, the edge 14a of the horizontal bar 14. The distance between the edge 14a and the auxiliary plated portion 25 is substantially the same at any position in the width direction of the automobile. In the same manner as the horizontal bars 12 to 14, the auxiliary plated portion 25 is formed from ABS. The auxiliary plated portion 25 forms part of the base 11. The auxiliary plated portion 25 is not limited to a single elongated material and may be divided into multiple pieces. In the same manner as the horizontal bars 12 to 14, a metal film 26 is formed on the auxiliary plated portion 25.

In the present embodiment, the auxiliary plated portion 25 has the shape of a plate but may have any other shape. The auxiliary plated portion 25 may be, for example, bent at a portion that is the closest to the edge 14a. In such a case, electric charges are apt to concentrate at the bent portion. This effectively reduces the concentration of electric charges at the edge 14a.

The grille inner member 10 that includes the horizontal bars 12 to 14 and the auxiliary plated portion 25, which are formed from ABS, and the frame 21, which is formed from PC, is formed through two-color molding. Two-color molding is a type of resin material molding method that combines two different types of materials to form a monolithic product. For example, the frame 21 (primary portion) is first molded in a mold, and the horizontal bars 12 to 14 and the auxiliary plated portion 25 (secondary portions) are then molded in the same mold integrally with the frame 21.

The grille outer member 30 is an ornamental member and shaped in conformance with the frame 21. Thus, the grille outer member 30 has the shape of a substantially rectangular frame that surrounds the grid G including the horizontal bars 12 to 14. The grille outer member 30 undergoes electroplating to form a metal film (not shown) having a different metallic luster from the metal films 26 of the horizontal bars 12 to 14 and the auxiliary plated portion 25 of the grille inner member 10.

The grille outer member 30 is formed from a resin such as ABS and is a discrete member separate from the grille inner member 10. The grille outer member 30 is coupled to the frame 21 from the front by an engagement portion such as hook. The grille outer member 30 that is arranged in front of the frame 21 in such a manner covers the frame 21 and the auxiliary plated portion 25 from the front.

The method for manufacturing the radiator grille RG will now be described.

First, two types of resin materials, namely, ABS and PC, are used to perform two-color molding and form the base 11 including the grid G, the frame 21, and the auxiliary plated portion 25. This forms the edges 12a, 13a, and 14a at the lower portions of the horizontal bars 12, 13, and 14 in the grid G. Further, the auxiliary plated portion 25 elongated in the width direction of the automobile is formed on the lower horizontal frame piece 23 of the frame 21.

In addition, the grille outer member 30 is formed from ABS separately from the base 11 of the grille inner member 10.

Figure 3:
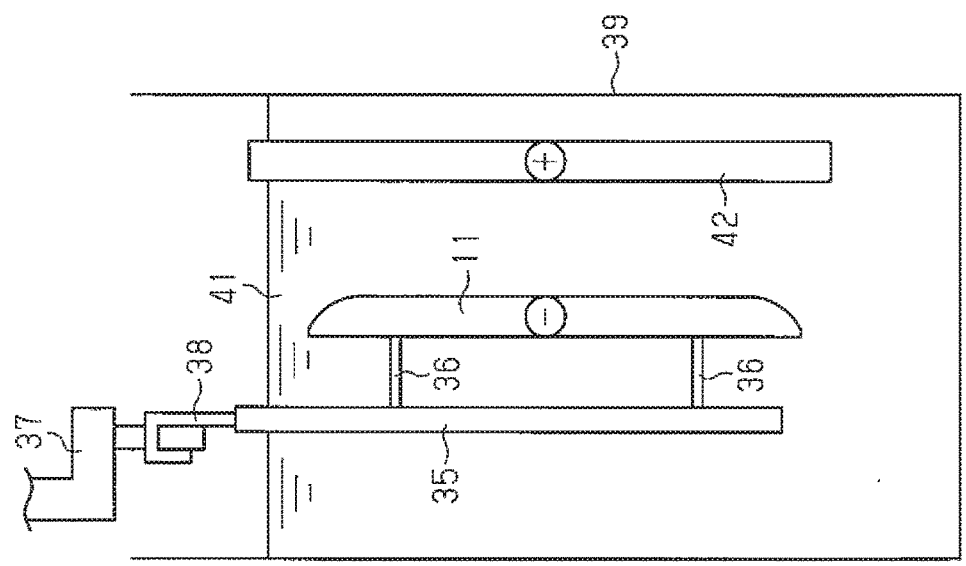
FIG. 3 is a schematic view showing an electroplating step in a manufacturing process of the radiator grille of the embodiment.

Then, as shown in FIG. 3, the base 11 of the grille inner member 10 is coupled to a jig 35. The jig 35 includes arms 36 that hold and fix the base 11, a transporter 37 that moves the jig 35 in the vertical direction and the horizontal direction, and a hook 38 that connects the arms 36 to the transporter 37. The transporter 37 moves the jig 35 to the outside of an electroplating tank 39. Then, the base 11 is coupled to the arms 36, and a conductivity applying step and an electroplating step are sequentially performed.

<Conductivity Applying Step>

In the conductivity applying step, the following surface treatment is performed on the base 11 coupled to the jig 35. First, surface preparation is performed on the base 11 to remove foreign material such as oil from the surface of the base 11. Next, an etchant is used to etch the base 11 and chemically roughen the surface of the base 11. Then, the surface of the base 11 is neutralized with acid to reduce and eliminate hexavalent chromium, which is one of the etching components. Subsequently, a catalyst treatment is performed on the base 11 so that a reductive and highly adsorptive catalyst (Pd—Sn compound) adsorbs the roughened surface of the base 11. Next, an accelerator (catalyst activation) treatment is performed on the base 11 to remove Sn from the surface of the base 11 and activate Pd. Then, the base 11 is immersed in an electroless plating tank so that electroless plating is performed on the base 11. This forms an electroless plating layer. When the conductivity applying step is performed in such a manner, conductivity is applied to each of the surfaces of the grid G and the auxiliary plated portion 25.

<Electroplating Step>

In the electroplating step, acid activation, strike plating, copper plating, semi-luster nickel plating, luster nickel plating, dispersion strike nickel plating, and chrome plating are sequentially performed. As shown in FIG. 3, each plating step is performed by immersing the base 11 into the electroplating tank 39 with the jig 35. The electroplating tank 39, which is filled with a plating solution 41, includes an anode electrode 42. An anode voltage is applied to the anode electrode 42. A cathode voltage is applied to the base 11 through the jig 35. Since a conductive electroless plating layer is formed on each of the surfaces of the grid G and the auxiliary plated portion 25 the surfaces are negatively charged when a cathode voltage is applied to the base 11.

As shown in FIG. 2, the auxiliary plated portion 25 formed on the lower horizontal frame piece 23 is spaced apart from the edge 14a of the horizontal bar 14 by a predetermined distance so that the auxiliary plated portion 25 does not contact the edge 14a. Accordingly, when a cathode voltage is applied to the base 11 in the electroplating step, the auxiliary plated portion 25 is negatively charged together with the horizontal bars 12 to 14 and functions as an auxiliary cathode electrode. Thus, since positive electric charges of the metal component dissolved in the plating solution 41 concentrate around the auxiliary plated portion 25, the concentration of electric charges at the edge 14a of the horizontal bar 14 is limited. As a result, concentration of plating metal deposited at the edge 14a is limited. This forms the metal films 26 with a relatively uniform thickness on the horizontal bars 12 to 14 and the auxiliary plated portion 25.

The horizontal bar 13 is the one of the horizontal bars 12 to 14 separated from the two vertical ends of the grid G. The horizontal bars 12 and 14 are adjacent to the horizontal bar 13 in the vertical directions. When a cathode voltage is applied to the base 11, the horizontal bar 13 is negatively charged together with the adjacent horizontal bars 12 and 14. Thus, the positive electric charges of the metal component dissolved in the electroplating solution concentrate separately around the horizontal bars 12, 13, and 14. Accordingly, although an auxiliary plated portion 25 is not arranged between the adjacent horizontal bars 12 and 13 and between the adjacent horizontal bars 13 and 14, the concentration of electric charges at the edges 12a and 13a is limited.

The horizontal bar 12 is the one of the horizontal bars 12 to 14 that does not have an edge, which is angled more than other portions, at the upper portion, which is located far from the lower adjacent horizontal bar 13. This limits situations in which the metal film 26 formed on the upper portion of the horizontal bar 12 through electroplating becomes much thicker than the metal films 26 of the other portions of the horizontal bar 12.

After the electroplating step is performed, a drying step, jig removal, and inspection are sequentially performed to obtain the grille inner member 10.

The grille outer member 30, which is separately molded and plated, is coupled to the frame 21 of the obtained grille inner member 10. In such a manner, the radiator grille RG is manufactured. In the radiator grille RG, the grille outer member 30 is located in front of the auxiliary plated portion 25. Thus, when the radiator grille RG is viewed from the front, the auxiliary plated portion 25 is hidden by the grille outer member 30 and cannot be seen.

The present embodiment has the advantages described below.

(1) The grille inner member 10 of the radiator grille RG (plated resin product) includes the resin base 11, which includes the horizontal bars 12 to 14 (main plated portions) and the auxiliary plated portion 25, and the metal films 26, which are respectively arranged on the horizontal bars 12 to 14 and the auxiliary plated portion 25. The horizontal bars 12 to 14 are arranged in the vertical direction parallel to and spaced apart from one another. The conductivity applying step and the electroplating step are performed to form the metal films 26 on the horizontal bars 12 to 14 and the auxiliary plated portion 25. The edge 14a is located in the lower portion of the lowermost horizontal bar 14, that is, the portion of the horizontal bar 14 located far from (at lower side of) the upper adjacent horizontal bar 13 (refer to FIGS. 1 and 2).

In the grille inner member 10, the auxiliary plated portion 25 is located farther from the horizontal bar 13, which is upwardly adjacent to the lowermost horizontal bar 14 including the edge 14a. Further, the auxiliary plated portion 25 is located at a position spaced apart from the horizontal bar 14. The metal film 26 on the auxiliary plated portion 25 is located at a section of the auxiliary plated portion 25 that is not visible when the radiator grille RG is viewed from the front.

This reduces concentration of plating metal deposited at the edge 14a of the horizontal bar 14. As a result, the thickness of the metal film 26 at the edge 14a is substantially the same as the thicknesses of the metal films 26 at the other portions of the horizontal bar 14. Since the metal film 26 of the edge 14a does not become too thick, the aesthetic appeal of the radiator grille RG is unaffected.

Further, the auxiliary plated portion 25 is not visible when the radiator grille RG is viewed from the front. Thus, the auxiliary plated portion 25 does not affect the aesthetic appeal of the radiator grille RG even though the auxiliary plated portion 25 is not removed after the metal films 26 are formed through electroplating. Since there is no need to remove the auxiliary plated portion 25, the grille inner member 10, and consequently the radiator grille RG, may be manufactured through fewer steps than the prior art.

(2) The base 11 further includes the frame 21 (non-plated portion), which is not provided with a metal film 26. The frame 21 includes the lower horizontal frame piece 23 located farther from the horizontal bar 13, which is upwardly adjacent to the lowermost horizontal bar 14 including the edge 14a. Further, the horizontal bar 13 is located at a position spaced apart from the horizontal bar 14. The radiator grille RG further includes the grille outer member 30 (ornamental member) that is arranged in front of the frame 21 and is an discrete member separate from the grille inner member 10. The auxiliary plated portion 25 is located between the lower horizontal frame piece 23 and the grille outer member 30 (refer to FIGS. 1 and 2). Thus, when the radiator grille RG is viewed from the front, the auxiliary plated portion 25 is hidden by the grille outer member 30 and cannot be seen. Accordingly, advantage (1) described above is obtained.

(3) The auxiliary plated portion 25 that functions as an auxiliary cathode electrode forms part of the base 11 and is formed integrally with the frame 21 through two-color molding. Thus, there is no need to perform a separate step to form the auxiliary plated portion 25. This keeps the number of manufacturing steps small.

It should be apparent to those skilled in the art that the present invention may be embodied in many other specific forms without departing from the spirit or scope of the invention. Particularly, it should be understood that the present invention may be embodied in the following forms.

The horizontal bars 12 to 14 (main plated portions) and the auxiliary plated portion 25 may be formed from a resin material other than ABS. Further, the frame 21 may be formed from a resin material other than PC.

The horizontal bars 12 to 14 may each have a cross-sectional shape that differs from the above embodiment. Further, the cross-sectional shapes of the edges 12a, 13a, and 14a may differ from the above embodiment.

The horizontal bars 12 to 14 may either have the same cross-sectional shape or have different cross-sectional shapes.

The auxiliary plated portion 25 may be arranged at a section that differs from the above embodiment. However, the auxiliary plated portion 25 needs to be located farther from the horizontal bar 13 than the horizontal bar 12 or 14, which is located at least one of the two ends in a direction in which the horizontal bars 12 to 14 are arranged, and spaced apart from the horizontal bar 12 or 14. Further, the metal film 26 on the auxiliary plated portion 25 needs to be located at a section of the auxiliary plated portion 25 that is not visible when the radiator grille RG is viewed from the front.

Figure 4:
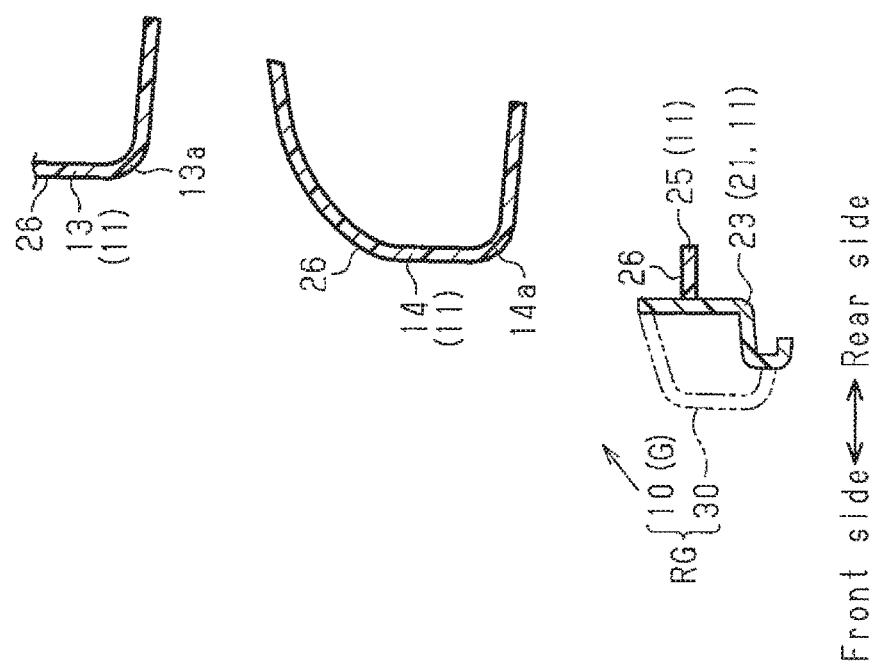
FIG. 4 is a cross-sectional side view showing a modified example of the auxiliary plated portion formed in the radiator grille at a location that differs from the embodiment.

For example, as shown in FIG. 4, the auxiliary plated portion 25, which forms part of the base 11, may be formed at the rear side (right side in FIG. 4) of the lower horizontal frame piece 23 of the frame 21 (non-plated portion). Even in such a case, the auxiliary plated portion 25 functions as an auxiliary cathode electrode during electroplating, limits concentration of plating metal deposited at the edge 14a of the horizontal bar 14, and forms the metal film 26 that has a generally uniform thickness on the horizontal bar 14. Further, the frame 21 (non-plated portion), which is not provided with a metal film 26, is located in front of the auxiliary plated portion 25. Thus, when the radiator grille RG is viewed from the front, the auxiliary plated portion 25 is hidden by the frame 21 (non-plated portion) and cannot be seen. Accordingly, even when the auxiliary plated portion 25 is not removed after forming the metal films 26 on the horizontal bars 12 to 14 and the auxiliary plated portion 25 through electroplating, the auxiliary plated portion 25 does not affect the aesthetic appeal of the radiator grille RG, as in the above embodiment. In addition, in this case, the grille outer member 30 may be omitted from the grille outer member 30.

A cathode voltage is applied to the horizontal bars 12 to 14 and the auxiliary plated portion 25 during the electroplating step. Thus, conductivity needs to be applied to the horizontal bars 12 to 14 and the auxiliary plated portion 25 prior to the electroplating step. To realize the conductivity application, for example, chemical (electroless) plating may be performed on the horizontal bars 12 to 14 and the auxiliary plated portion 25. Alternatively, conductive materials may be mixed with the resin materials (ABS) that form the horizontal bars 12 to 14 and the auxiliary plated portion 25.

In electroplating (electrolytic plating), the metal film 26 is formed by using one or more types of metal components selected from, for example, copper, nickel, and chromium. The metal film 26 does not have to be formed by a single layer and may be formed by two or more layers.

The edge 12a of the uppermost horizontal bar 12 (main plated portion) of the horizontal bars 12 to 14 may be arranged at the upper portion of the horizontal bar 12, that is, the portion located far from the lower adjacent horizontal bar 13 (main plated portion). In this case, the auxiliary plated portion 25 is located farther from the lower adjacent horizontal bar 13 than the horizontal bar 12 and spaced apart from the horizontal bar 12. Further, the metal film 26 on the auxiliary plated portion 25 is arranged at a section of the auxiliary plated portion 25 that is not visible when the radiator grille RG is viewed from the front.

The present invention may be applied to the radiator grille RG including an edge at the upper portion of the horizontal bar 14 (portion located close to upper adjacent horizontal bar 13) in addition to at the lower portion of the horizontal bar 14 (portion located far from horizontal bar 13). In the same manner, the present invention may be applied to the radiator grille RG including an edge 13a at the upper portion of the horizontal bar 13 in addition to at the lower portion of the horizontal bar 13.

The present invention may be applied to a radiator grille RG having a number of horizontal bars that differs from the above embodiment. However, the number of the horizontal bars is at least two.

When the present invention is applied to the radiator grille RG, the auxiliary plated portion 25 may be formed in the coupling hole 16 of the seat 15 (refer to FIG. 1). In this case, the ornament 17 coupled to the seat 15 closes the coupling hole 16 so that the ornament 17 is located in front of the auxiliary plated portion 25. Thus, when the radiator grille RG is viewed from the front, the auxiliary plated portion 25 is hidden by the ornament 17 and cannot be seen.

The present invention may be applied to a radiator grille RG including, in addition to or instead of the horizontal bars 12 to 14, a plurality of vertical bars (not shown) that are extended in the substantially vertical direction, arranged next to one another in the width direction of the automobile, and separated from one another. The vertical bars may extend inclined relative to the vertical direction.

The present invention does not have to be applied to the radiator grille RG in which the grid G includes the horizontal bars 12 to 14 and/or the vertical bars. Instead, the present invention may be applied to, for example, the radiator grille RG in which the grid G has a honeycomb structure. Alternatively, the grid G may have a plurality of rhombic portions that are arranged next to and separated from one another.

The metal film 26 on each of the horizontal bars 12 to 14 only needs to be located at least at a section of each of the horizontal bars 12 to 14 that is visible when the radiator grille RG is viewed from the front. The metal film 26 may be arranged at a section that differs from the above embodiment. For example, the metal film 26 on each of the horizontal bars 12 to 14 may be arranged only at a section of each of the horizontal bars 12 to 14 that is visible when the radiator grille RG is viewed from the front.

The present invention may be applied to the radiator grille RG including the grid G formed by a portion that is provided with a metal film (main plated portion) and a portion that is not provided with a metal film (non-plated portion).

The present invention may be applied to a vehicle exterior component other than the radiator grille RG. Alternatively, the present invention may be applied to a vehicle interior component.

The present examples and embodiments are to be considered as illustrative and not restrictive, and the invention is not to be limited to the details given herein, but may be modified within the scope and equivalence of the appended claims.

The invention claimed is:

1. A plated resin product comprising:
a resin base including a plurality of main plated portions and an auxiliary plated portion; and
metal films respectively arranged on the plurality of main plated portions and the auxiliary plated portion, wherein
the plurality of main plated portions are arranged next to and spaced apart from one another, wherein
the plurality of main plated portions includes at least an upper main plated portion and a lower main plated portion spaced apart from the upper main plated portion,
the lower main plated portion includes an edge that faces the auxiliary plated portion,
the auxiliary plated portion is located farther from the upper main plated portion than the lower main plated portion including the edge and spaced apart from the lower main plated portion including the edge,
the metal films arranged on each of the plurality of main plated portions are visible from a front of the plated resin product, and
the metal films arranged on the auxiliary plated portion are not visible from a direction facing a front of an outer grille member coupled to the auxiliary plated portion of the resin base.

2. The plated resin product according to claim 1, wherein
the base further includes a non-plated portion, which is not provided with a metal film,
the non-plated portion is located farther from the upper main plated portion than the lower main plated portion including the edge and spaced apart from the lower main plated portion including the edge, and
the auxiliary plated portion is located at a rear side of the non-plated portion.

3. The plated resin product according to claim 1, wherein
the base further includes a non-plated portion, which is not provided with a metal film,
the non-plated portion is located farther from the upper main plated portion than the lower main plated portion including the edge and spaced apart from the lower main plated portion including the edge,
the plated resin product further comprises an ornamental member located in front of the non-plated portion, wherein the ornamental member is a discrete member separate from the base, and
the auxiliary plated portion is located between the non-plated portion and the ornamental member.

4. The plated resin product according to claim 3, wherein
the plurality of main plated portions of the base form at least a main portion of a grid,
the non-plated portion of the base forms a frame that surrounds the grid,
the grid, the frame, and the metal films form a grille inner member of a radiator grille,
the ornamental member is frame-shaped and coupled to the frame of the grille inner member from the front to form the grille outer member of the radiator grille, and
the auxiliary plated portion is located between the grille outer member and the frame of the grille inner member.

5. A method for manufacturing a plated resin product, the method comprising:
providing a resin base including a plurality of main plated portions and an auxiliary plated portion, the plurality of main plated portions are arranged next to and spaced apart from one another, the plurality of main plated portions includes at least an upper main plated portion and a lower main plated portion spaced apart from the upper main plated portion in a direction in which the plurality of main plated portions are arranged, the lower main plated portion includes an edge that faces the auxiliary plated portion, the auxiliary plated portion is located farther from the upper main plated portion than the lower main plated portion including the edge and spaced apart from the lower main plated portion including the edge;

applying conductivity to each surface of the plurality of main plated portions and the auxiliary plated portion;

electroplating the plurality of main plated portions and the auxiliary plated portion such that metal films are respectively arranged on the plurality of main plated portions and the auxiliary plated portion, wherein the metal films arranged on each of the plurality of main plated portions are visible from a front of the plated resin product and the metal films arranged on the auxiliary plated portion are not visible from a direction facing a front of an outer grille member coupled to the auxiliary plated portion of the resin base, wherein the electroplating includes:

applying an anode voltage to an anode electrode in an electroplating tank and a cathode voltage to the plurality of main plated portions and the auxiliary plated portion so that the auxiliary plated portion functions as an auxiliary cathode electrode after each surface of the plurality of main plated portions and the auxiliary plated portion become conductive in the applying of the conductivity.

* * * * *